United States Patent [19]

Wetherington

[11] Patent Number: 4,914,822
[45] Date of Patent: Apr. 10, 1990

[54] HINGE JIGS

[76] Inventor: Earl Wetherington, 3445 Jacona Dr., Jacksonville, Fla. 32211

[21] Appl. No.: 402,212

[22] Filed: Sep. 1, 1989

Related U.S. Application Data

[63] Continuation of Ser. No. 177,374, Apr. 4, 1988, abandoned.

[51] Int. Cl.[4] ............................................. B27G 23/00
[52] U.S. Cl. ........................................ 33/197; 33/562
[58] Field of Search ................... 33/197, 562; 144/27, 144/144.5 R, 56, 144.54 T

[56] References Cited

U.S. PATENT DOCUMENTS

| | | | |
|---|---|---|---|
| 464,867 | 12/1891 | Harris | 33/197 |
| 1,008,826 | 11/1911 | Humphrey | 33/197 |
| 1,019,811 | 2/1912 | Scelza | 33/197 |
| 1,050,155 | 1/1913 | Mason | 33/197 |
| 1,326,583 | 12/1919 | Catalanotto | 33/197 |
| 1,417,431 | 5/1922 | Vogt | 144/27 |
| 1,977,878 | 10/1934 | Henry | 33/197 |
| 2,659,159 | 11/1953 | Jarrett | 33/197 |
| 3,559,704 | 2/1971 | Thompson | 33/197 |
| 3,738,013 | 6/1973 | Gregory | 33/197 |
| 4,553,336 | 11/1985 | Ponce | 33/197 |

*Primary Examiner*—Thomas B. Will
*Attorney, Agent, or Firm*—Thomas C. Saitta

[57] ABSTRACT

A hinge jig having three longitudinal members and two transverse members all relatively adjustable to the each other with respect to angle and distance. Stop flanges delineate the outer limits for movement of the router bit when cutting a door hinge. The router base is rested directly onto the planar surfaces of the longitudinal and transverse members, which are adjusted to the particular size and shape cut-out desired. The jig can be adjusted to define cut-outs having other than right angles.

8 Claims, 2 Drawing Sheets

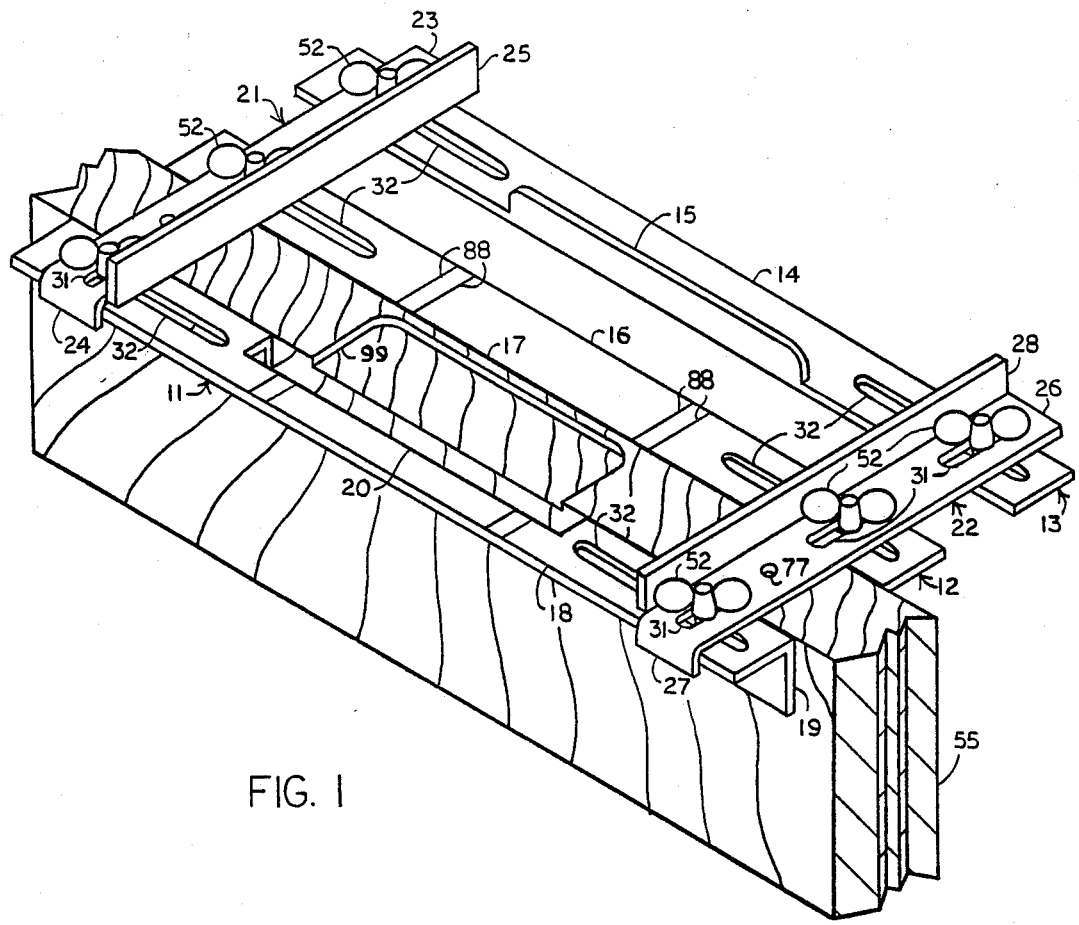
FIG. 1
FIG. 2
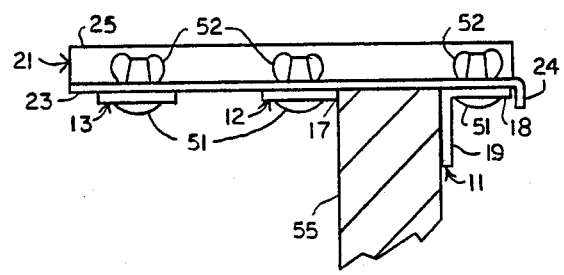

HINGE JIGS

This application is a continuation of application Ser. No. 07/177,374 filed Apr. 4, 1988, now abandoned.

BACKGROUND OF THE INVENTION

The invention relates generally to the field of jigs or templates used as guides for routers when setting hinges into doors or door jambs. More particularly, the invention relates to such jigs which are adjustable and which guide the base of the router housing rather than the router cutter bit or a bushing sleeve around such bit.

The use of hinge jigs is well known in the art and many various types have been designed. On the simplest scale, a template comprising a metal plate having an open area is attached to the door and the cut is made within the defined open area. This type of jig is not adjustable for different size or shape hinges. Harris in U.S. Pat. No. 464,867 teaches an adjustable marking gage which could also be used as a jig, although this use is not taught. The Harris device is adjustable longitudinally and transversely to adjust for different size hinges. The Harris device does not self-mount and must be held in place.

Mason in U.S. Pat. No. 1,050,155 teaches a gage adjustable in two perpendicular directions where the central open area is used to guide the cutting implement. The Mason device is attached to the door by a nail or screw. By loosening screws the main plate can be adjusted in the transverse direction and a sliding arm can be adjusted in the longitudinal direction. In U.S. Pat. No. 1,326,583, Catalanotto teaches a hinge setter that is self-mounting to the door, in the manner of a wrap-around vise. The cutting area is adjustable in the two major directions by loosening screws and moving plates.

All of the previously known devices suffer from several major drawbacks. One major problem is that the devices all delineate the cutting area by framing the router bit or router bushing sleeve. A router has a spinning bit with highly sharpened blades which extends below a circular or primarily circular base to perform the routing operation. Obviously, a metal template or jig which defines the cutting area by providing stops to abut the bit can damage the bit and mar the stops themselves. Therefore, it is common practice when using the known jigs to add a protective bushing or sleeve around the bit. It is this bushing that then contacts the metal stops of the jig. This is advantageous in that an additional part, the bushing, must be handy and time must be taken to attach it to the router, a task which usually involves removing the base of the router housing. Furthermore, a different size bushing is required for different size cutter bits.

Another problem with some conventional jigs is that the user must be concerned with properly aligning the bit to make a true cut and must eliminate the depth of cut, since the router base, which is designed so that it is normally rested on the workpiece itself during the cutting operation, must be hand-held above the various wing nuts, bolts, knobs and flanges extending from the jig. The jigs and templates are constructed to delineate the cutting area only, and are not designed to provide a planar resting surface for the base of the router.

A third problem with the known prior art is that the devices are all adjustable only in the two main directions, i.e., longitudinally to the edge of the door and transversely across the door edge. The known devices are all constructed so as to maintain a cutting area having right angles, so only rectangular or square cuts can be made.

The invention differs from the prior art and solves the above problems by being a self-mounting jig adjustable in not only the longitudinal and transverse directions, but also angularly as well. Furthermore, the device delineates the cutting area by providing stops for the router base, not the router bit or bushing. The user rests the router on the planar surface of the devise, sets the proper depth for the cutter and slides the edge of the base against the various stops to cut out the area for the hinge. No additional bushing sleeve is required, since the router bit does not contact the jig. The stops can be set such that a cut-out for a trapezoidal or even triangular hinge can be made. The device is designed such that it is easily adjustable and easy to attach, use and remove.

It is an object of this invention to provide a router jig for delineating cut-outs for door hinges which is self-mounting and easily adjustable, where the cut-out is delineated by setting stops to abut the router base itself and where a planar surface for resting the router base during the cutting operation is further provided.

It is a further object to provide such a jig that is adjustable not only in the longitudinal and transverse directions, but is also adjustable to provide angular cut-outs for non-rectangular hinges.

It is a further object of the invention to provide such a jig adaptable for use on both door edges and door jambs.

BRIEF SUMMARY OF THE INVENTION

The device primarily comprises three longitudinal members and two transverse members, all being relatively adjustable. The transverse members are attached to the longitudinal members, one transverse member being attached near one end of each longitudinal member, the other transverse member being attached near the other end of each member. The attachment is not permanent, but is made by insertion of a fastening means through slots in each of the longitudinal and transverse members. The transverse members can be adjusted a closer or farther distance from each other, and the longitudinal members can be adjusted closer or farther from each other as well. Furthermore, the transverse members can be adjusted to be perpendicular to the longitudinal members or can be adjusted at other than a right angle to the longitudinal members.

One longitudinal member has a right angle configuration, such that a flange extends from the side opposite the transverse members and faces the other longitudinal members. This longitudinal member has an open portion centrally located and facing the other longitudinal members. The outside longitudinal member and the two transverse members have perpendicular stops extending upward on the interior side of each member. The right angle longitudinal member and the central longitudinal member provide a planar support surface for the router base during the cutting operation.

By adjusting the central longitudinal member, the device is affixed to the door end at the proper location, where the door end is held between the flange of the right angle longitudinal member and edge of the central longitudinal member. By adjusting the transverse members and the outside longitudinal member to the proper distance and angle, movement of the router base within the stops produces a cut-out area of the desired size and configuration.

BRIEF DESCRIPTION OF THE DRAWINGS

FIG. 1 is a perspective view of the device as mounted onto a door edge.

FIG. 2 is an end view of the device as mounted onto a door edge.

DETAILED DESCRIPTION OF THE INVENTION

Figure 3:
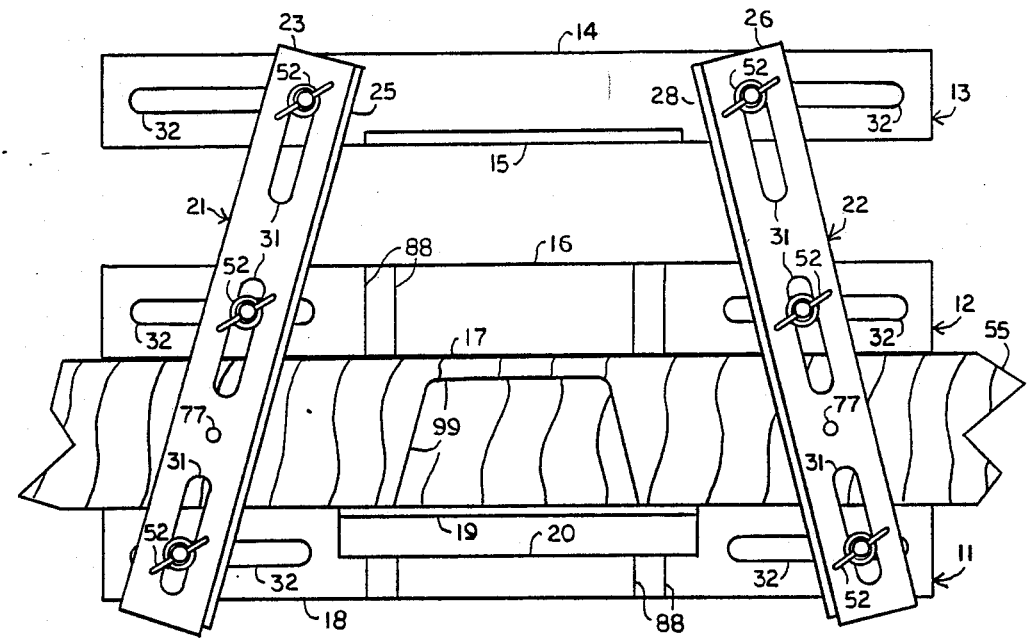
FIG. 3 is a top view of the device as adjusted for a non-rectangular hinge.

The invention can most easily be described using reference directions compatible with FIG. 1, which shows the device affixed to the interior edge of a door laid on its side, in position for easy cutting. Any references to the upward or vertical direction shall mean the direction as the device is situated in this illustration. Reference to the longitudinal direction shall mean the direction parallel to the lengthwise direction of the door edge, and reference to the transverse direction shall mean the direction across the door edge; perpendicular to the longitudinal direction and the vertical direction. Any references to the interior shall mean towards the center of the device.

With reference now to FIG. 1, the device comprises three longitudinal members and two transverse members. The longitudinal members are gripping support member 11, central support member 12 and limiting member 13. The transverse members are limiting members 21 and 22. Each of these members are substantially bar shaped, either flat or L-shaped, and preferably constructed of a hard metal.

Limiting members 21 and 22 are reverse images of each other. Limiting member 21 comprises a slotted base 23, a perpendicular end flange 24 and a stop flange 25 extending perpendicularly upward from slotted base 23 on the interior side of limiting member 21. Limiting member 22 comprises corresponding slotted base 26, perpendicular end flange 27 and stop flange 28 extending perpendicularly upward from slotted base 26 on the interior side of limiting member 22. Stop flanges 25 and 28 run substantially the entire length of transverse members 21 and 22. Three transverse member slots 31 form openings completely through each slotted base 23 and 26. The transverse member slots 31 are aligned on the long midline of each slotted base 23 and 26.

Limiting member 13 comprises a slotted base 14 and a stop flange 15 extending perpendicularly upward from slotted base 14 on the interior side of limiting member 13. Two longitudinal member slots 32 form openings completely through slotted base 14 and are aligned on the long midline of slotted base 14, one slot 32 near each end. Stop flange 15 is centrally located on limiting member 13 and extends roughly half the length of limiting member 13.

Central support member 12 comprises a planar upper surface 16 and a gripping edge 17. Two longitudinal member slots 32 form openings completely through central support member 12 and are aligned on the long midline of central support member 12, one slot 32 near each end.

Gripping support member 11 comprises a planar upper surface 18, a gripping flange 19 and a central clearance aperture 20. The gripping flange 19 extends perpendicularly downward from planar upper surface 18 on the interior side of gripping support member 11. Clearance aperture 20 is centrally located on the interior side of gripping member 11, extending roughly to the long midline of upper surface 18 and downward roughly to the long midline of gripping flange 19. Two longitudinal member slots 32 form openings completely through the planar upper surface 18 of gripping support member 11 and are aligned on the long midline of upper surface 18, one slot 32 near each end.

The longitudinal and transverse members are adjustably attached to one another by suitable fastening means inserted through the slots 31 and 32. Preferably, carriage bolts 51 and wing nuts 52 are used as the fastening means. Carriage bolts 51 are constructed such that a squared shoulder abuts the bolt head and threaded rod. This squared shoulder fits into the slots 31 or 32 and prevents the bolt 51 from turning. This allows wing nut 52 to be tightened and loosened by one hand without requiring recourse to a tool to prevent turning of the bolt 51. Washers, not shown, may also be used in conjunction with wing nuts 52 and carriage bolts 51.

Limiting member 21 is attached to one end of gripping support member 11, central support member 12 and limiting member 13 by aligning the transverse member slots 31 over the longitudinal members slots 32. Carriage bolts 51 are inserted from below the longitudinal members and wing nuts 52 are threaded on. The perpendicular end flange 24 of limiting member 21 extends down beyond the exterior edge of gripping member 11. The stop flange 25 of limiting member 21 extends vertically on the interior side of limiting member 21. In like manner, limiting member 22 is attached to the other end of gripping support member 11, central support member 12 and limiting member 13. The perpendicular end flange 27 of limiting member 22 extends down beyond the exterior edge of gripping member 11. The stop flange 28 of limiting member 22 extends vertically on the interior side of limiting member 22 and faces stop flange 25 of limiting member 21. Stop flange 15 of limiting member 13 faces the interior of the device, the three stop flanges 15, 25 and 28 thereby forming a boundary to contain the router base, thus delineating the size and shape of the cut-out area by their relative positions.

With reference now to both FIG. 1 and FIG. 2, the device can be seen as affixed to the edge of a door 55. The desired hinge location is marked onto the door 55 and the device is positioned such that the door 55 is between gripping member 11 and central support member 12. The device is positioned in the longitudinal direction so that clearance aperture 20 extends to either side of the intended cut-out area 99. Clearance aperture 20 provides an open zone for the router bit during the cutting operation, since cut-out 99 will extend completely to the edge of door 55 of this side. There being no need for a stop flange in this direction, clearance aperture 20 insures that the router bit will not be damaged by the metal of gripping support member 11, either on the planar upper surface 18 or the gripping flange 19.

The gripping flange 19 of gripping support member 11 forms a frame along with the underside of limiting members 21 and 22 and the gripping edge 17 of central support member 12. After loosening the wing nuts 52 connecting central support flange 12 to the two transverse members, central support member 12 is positioned tightly against door 55 and the wing nuts 52 are tightened. The middle transverse member slots 31 on each limiting member 21 and 22 allow movement of central support member 12 in either transverse direction to accommodate doors of any width. With central support member 12 in place, the device is self-mounted onto the door 55. Should additional affixation be required, apertures 77 can be provided in the transverse members so that temporary nails or screws can be placed into the door 55 to hold the device in place.

In order to set the device for the proper size and shape cut-out 99, the user first determines the distance from the edge of the router base to the edge of the cutting bit for the particular router being used. For example, a typical router has a circular base six inches in diameter. When using an one-half inch cutter bit, the distance from base edge to cutter edge will be two and three-quarter inches. The user then sets each of the stop flanges this distance from the perimeter of the intended cut-out area 99. By loosening the wing nuts 52, the limiting members 21 and 22 can be positioned in the longitudinal direction, using the longitudinal member slots 32, such that the stop flange 25 of limiting member 21 is parallel to and the correct distance from one transverse edge of cut-out 99 and the stop flange 28 of limiting member 22 is parallel to and the correct distance from the other transverse edge of cut-out 99. Limiting member 13 will be positioned in the transverse direction using the transverse member slots 31 so that stop flange 15 is parallel to and the correct distance from the longitudinal edge of cut-out 99. Wing nuts 52 are then tightened and the device is ready to be used as a guide for routing the cut-out area 99. For rectangular or square hinges requiring cut-outs 99 with right angles, the perpendicular flanges 24 and 27 of the transverse members are abutted against the exterior edge of gripping support member 11, thereby maintaining the transverse limiting members 21 and 22 in a position at right angle to gripping support member 11. To make the cut-out 99, the router base is placed flush onto the planar surfaces of gripping support member 11 and central support member 12, the cutter bit having been set to the desired depth. The router is then moved within the area delineated by stop flanges 15, 25 and 28, which prevent the cutter bit from extending into the area beyond the desired cut-out 99.

If desired, scribe lines 88 can be marked at measured intervals on the upper surfaces of central support member 12 and gripping support member 11 to set out standard hinge sizes or to allow for incremental setting of the transverse members without recourse to outside measuring tapes.

The device can also be adjusted, as shown in FIG. 3, to be used with hinges having a trapezoidal or triangular shape. For example, a hinge can have a plate four inches long at the pivot, yet only three inches long at the far edge, the sides therefore being angled inwardly. The device is affixed to the door 55 as previously described. Because the transverse member slots 31 cross the longitudinal member slots 32, the limiting members 21 and 22 can be angled such that the ends attached to the gripping support member 11 are spaced farther apart than the ends attached to the limiting member 13. Stop flanges 25 and 28 will therefore be angled when the wing nuts 52 are tightened, and the area delineated by the stop flanges 15, 25 and 28 will be trapezoidal in shape. Through similar adjustment of the transverse members, a number of angles can be obtained.

Furthermore, there are often situations where a hinge needs to be attached slightly off-line, for example, where the jamb is not perpendicular to the floor or where there is warping. In a manner similar to setting the device for a trapezoidal hinge, the device can be adjusted so that the cut-out will be rectangular but not at a right angle to the edge of the door 55. The transverse members are adjusted so as to be parallel to each other, but at a non-right angle to gripping support member 11. Limiting member 13 is set to be perpendicular to the transverse members. The cut-out area 99 made by the router will therefore be at a non-right angle to the edge of the door 55, but will still be rectangular with respect to the longitudinal and transverse edges.

Figure 4:
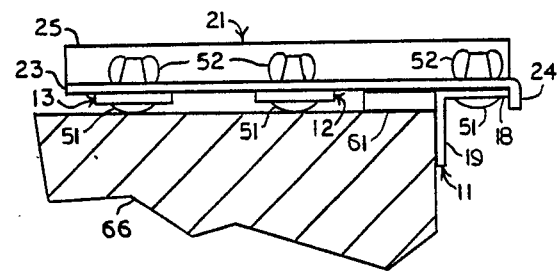
FIG. 4 is an end view of the device as mounted onto a door jamb, illustrating the use of spacers to maintain proper alignment.

With reference now to FIG. 4, the device is shown as used on the door jamb 66. Since the jamb 66 is much wider than the door 55, the device is placed in the proper position for the desired hinge cut-out. To maintain the device parallel to the surface of the jamb 66, shims 61 are placed under the transverse limiting members 21 and 22 and the device is attached using nails or screws through apertures 77. As before, gripping flange 19 of gripping support member 11 is placed flush to the edge of jamb 66. The device can be adjusted for any particular shape or alignment as described above.

The above examples and illustrations are by way of example only and it will be suggested by the above disclosure to one skilled in the art that certain equivalents and substitutions are obvious. The true definition and scope of the invention is therefore as set forth in the following claims.

I claim:

1. A hinge jig for use with routers, comprising three longitudinal members and two transverse members, where both of said transverse members are releasably attached to each of said longitudinal members so that all of said longitudinal and transverse members can be repositioned relative to each other;

one of said longitudinal members being an outer gripping support member comprising a planar upper surface, a gripping flange extending perpendicularly below said planar upper surface, and a clearance aperture positioned centrally along an interior edge of said outer gripping support member;

another of said longitudinal members being a central gripping support member comprising a planar upper surface and a gripping edge;

another of said longitudinal members being an outer limiting member comprising a stop flange extending perpendicularly above a base;

and each of said transverse members being a limiting member comprising a stop flange extending perpendicularly above a base, wherein each of said stop flanges of said transverse members is located at an interior position in said jig.

2. The device of claim 1, where each of said longitudinal members further comprise two slots and each of said transverse members further comprise three slots, where said longitudinal and transverse members are releasably attached by fastening members inserted through said slots.

3. The device of claim 2, where said fastening members are carriage bolts and wing nuts.

4. The device of claim 1, where said gripping flange of said gripping support member extends from said interior edge of said planar upper surface.

5. The device of claim 1, where said longitudinal member stop flange extends from an edge of said base of said longitudinal member and each of said transverse member stop flanges extends from an edge of each respective said base.

6. The device of claim 5, where each of said stop flanges extend from an interior edge of each respective said base.

7. The device of claim 1, where each of said transverse members further comprises an end flange extending perpendicularly below said base.

8. The device of claim 1, where said longitudinal and transverse members can be repositioned relative to each other at angles other than right angles.

* * * * *